US007624370B2

(12) United States Patent
Bibr et al.

(10) Patent No.: US 7,624,370 B2
(45) Date of Patent: Nov. 24, 2009

(54) SYSTEM AND METHOD FOR FACILITATING DEVELOPMENT OF AN APPLICATION AND SUPPORTING ACCESS TO A PLURALITY OF HETEROGENEOUS BACKEND SERVERS

(75) Inventors: Viera Bibr, Kilbride (CA); Brindusa Fritsch, Toronto (CA); Michael Cacenco, Brampton (CA); Michael Shenfield, Richmond Hill (CA); Leo Pechersky, Aurora (CA)

(73) Assignee: Research In Motion Limited, Waterloo (CA)

( * ) Notice: Subject to any disclaimer, the term of this patent is extended or adjusted under 35 U.S.C. 154(b) by 752 days.

(21) Appl. No.: 11/107,887

(22) Filed: Apr. 18, 2005

(65) Prior Publication Data

US 2006/0236313 A1    Oct. 19, 2006

(51) Int. Cl.
    *G06F 9/44* (2006.01)
(52) U.S. Cl. .................. 717/100; 717/107; 709/219
(58) Field of Classification Search .......... 717/104, 717/107; 715/526
    See application file for complete search history.

(56) References Cited

U.S. PATENT DOCUMENTS

| 2004/0088352 | A1 | 5/2004 | Kurth | |
| 2006/0036941 | A1* | 2/2006 | Neil | 715/526 |
| 2006/0236302 | A1* | 10/2006 | Bateman et al. | 717/104 |
| 2006/0253834 | A1* | 11/2006 | Cacenco et al. | 717/107 |

OTHER PUBLICATIONS

Hoang Pham Huy et al: "Web Service Gateway—a step forward to e-business" 2004—pp. 648-655.
Chandra Venkatapathy, Simon Holdsworth—"An Introduction to Web Services Gateway Online"—2002—pp. 1 to 6.
"Migrating to Web Services—latency and scalability"—http://CSDL.COMPUTER.ORG/COMP/PROCEEDINGS/WSE/2002/1804/00/18040013ABS.H DWWW-2002—pp. 1 to 3.
"Eclipse Unveils Web Services Tools Online"—Mar. 8, 2005—paragraph 0001-0006.
Martin Fowler: "Patterns of Enterprise Application Archtitecture"—May 11, 2001, pp. 466-468.
Search Report issued by the European Patent Office on Oct. 28, 2005 with respect to European Patent Application No. EP 05103096.3.

* cited by examiner

*Primary Examiner*—Lewis A Bullock, Jr
*Assistant Examiner*—Jue S Wang
(74) *Attorney, Agent, or Firm*—Gowling Lafleur Henderson LLP (57) ABSTRACT

A plug-in is provided for use with an authoring application. The plug-in facilitates development of a wireless application in communication with a backend server via a corresponding connector. The plug-in comprises an interface and an assembler. The interface interfaces with the authoring application and receiving a desired inquiry from the authoring application to be posted to the backend server. The assembler creates a schema-based description document describing the inquiry in accordance with a set of predefined criteria for ensuring that the connector is able to interpret the description document.

5 Claims, 6 Drawing Sheets

SYSTEM AND METHOD FOR FACILITATING DEVELOPMENT OF AN APPLICATION AND SUPPORTING ACCESS TO A PLURALITY OF HETEROGENEOUS BACKEND SERVERS

This application relates generally to application development environments and specifically to a system and method for using a plug-in to an application development environment for supporting development of applications for heterogeneous backend servers.

BACKGROUND OF THE INVENTION

Due to the proliferation of wireless networks, there are a continually increasing number of wireless devices in use today. These devices include mobile telephones, personal digital assistance (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries. These software applications take advantage of the ability to transmit data of the wireless network in order to provide timely and useful services to users, often in addition to voice communication. However, due to a plethora of different types of devices, restricted resources of some devices, and complexity of delivering large amounts of data to the devices, developing software applications remains a difficult and time-consuming task.

Currently, devices are configured to communicate with Web Services through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Applications for browsers are efficient tools for designing platform independent applications. Accordingly, different runtime environments, regardless of the platform, execute the same application. However, since different wireless devices have different capabilities and form factors, the application may not be executed or displayed as desired. Further, browser based application often require significant transfer bandwidth to operate efficiently, which may be costly or even unavailable for some wireless devices. Also, browsers offer very limited functionality without a live over the air (OTA) connection.

On the other hand, native applications are developed for a specific wireless device platform, thereby providing a relatively optimized application program for a runtime environment running on that platform. Also, such an application would allow organization and persistence of data collections in an optimized form on the device, which would be available even when the device is off-air. However, a platform dependent application introduces several drawbacks, including having to develop multiple versions of the same application and being relatively large in size, thereby taxing memory resources of the wireless device. Further, application developers need experience with programming languages such as Java and C++ to construct such native applications.

Further, applications are currently designed to communicate with Web Services. However, more frequently other types of backend servers are being made available to the applications. In order to expose these backend servers to the applications, Web Service are developed to interface with the backend servers.

Communication with the Web Service is typically achieved via Simple Object Access Protocol (SOAP). However, SOAP is big and complicated without offering much in the way of service. Also, adding a Web Service solely as an interface to the backend server adds unnecessary complexity to the system and may limit its functionality. It is preferable to be able to provide extensibility to different backend servers without requiring intimate a priori knowledge of the details of the backend server.

Yet further, application developers are provided with few tools to facilitate their development of the application for different backend servers. Accordingly, they are required to know the details of the communication language used in order to properly develop an application.

Accordingly there is a need for a system to facilitate providing a developer with access to a plurality of different backend servers while developing an application in order to overcome some of the disadvantages of the prior art.

SUMMARY OF THE INVENTION

In accordance with the present invention there is provided a plug-in for use with an authoring application, the plug-in for facilitating development of a wireless application in communication with a backend server via a corresponding connector, the plug-in comprising: an interface for interfacing with the authoring application and for receiving from the authoring application a desired inquiry to be made to the backend server; and an assembler for creating a schema-based description document describing the inquiry in accordance with a set of predefined criteria for ensuring that the connector is able to interpret the description document.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

Figure 1:
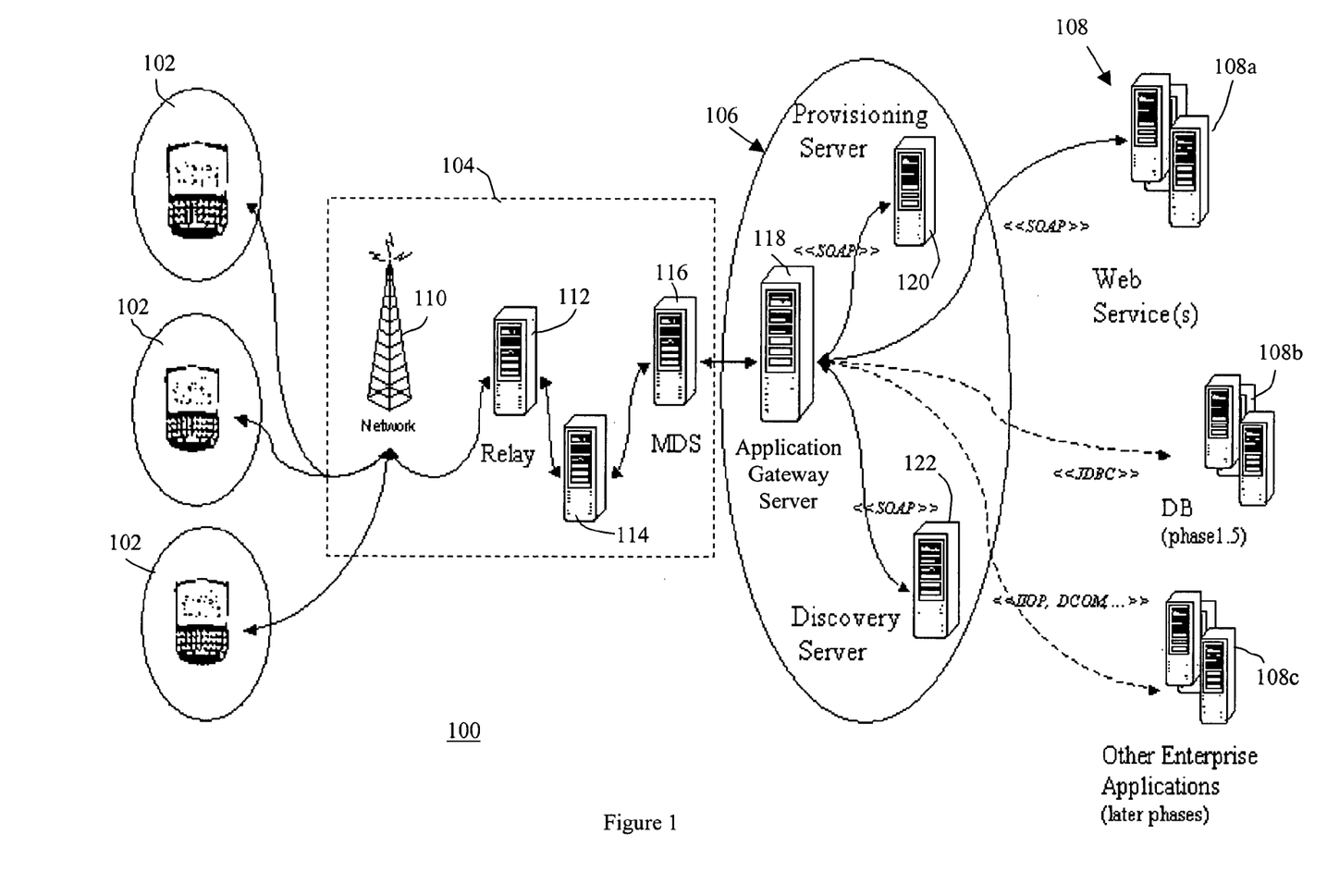
FIG. 1 is a block diagram of a network facilitating wireless component applications.

For convenience, like numerals in the description refer to like structures in the drawings. Referring to FIG. 1, a communication infrastructure is illustrated generally by numeral 100. The communication infrastructure 100 comprises a plurality of communication devices 102, or simply devices 102, a communication network 104, an application gateway 106, an application development environment 107 and a plurality of backend servers 108.

The devices 102 include both wired and wireless computing devices such as a desktop computer, a laptop or other portable computer, a smart phone, a personal digital assistant (PDA), and the like. The devices 102 are in communication with the application gateway 106 via the communication network 104. Accordingly, the communication network 104 may include several components such as a wireless network 110, a relay 112, a corporate server 114 and/or a mobile data server 116 for relaying data between the devices 102 and the application gateway 106.

The application gateway 106 comprises a gateway server 118 a provisioning server 120 and a discovery server 122. The gateway server 118 is in communication with both the provisioning server 120 and the discovery server 122. The gateway server 110 is further in communication with a plurality of the backend servers 108, such as web services 108a, database services 108b, as well as other enterprise services 108c, via a suitable link. For example, the gateway server 110 is connected with the web services 108a and database services 108b via Simple Object Access Protocol (SOAP) and Java Database Connectivity (JDBC) respectively. Other types of backend servers 108 and their corresponding links will be apparent to a person of ordinary skill in the art. Accordingly, it can be seen that the gateway server 118 acts as a message broker between the devices 102 and the backend servers 108.

Each wireless device 102 is initially provisioned with a service book establishing various protocols and settings, including connectivity information for the corporate server 114 and/or the mobile data server 116. These parameters may include a Uniform Resource Locator (URL) for the application gateway server 118 as well as its encryption key. Alternately, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Figure 2:
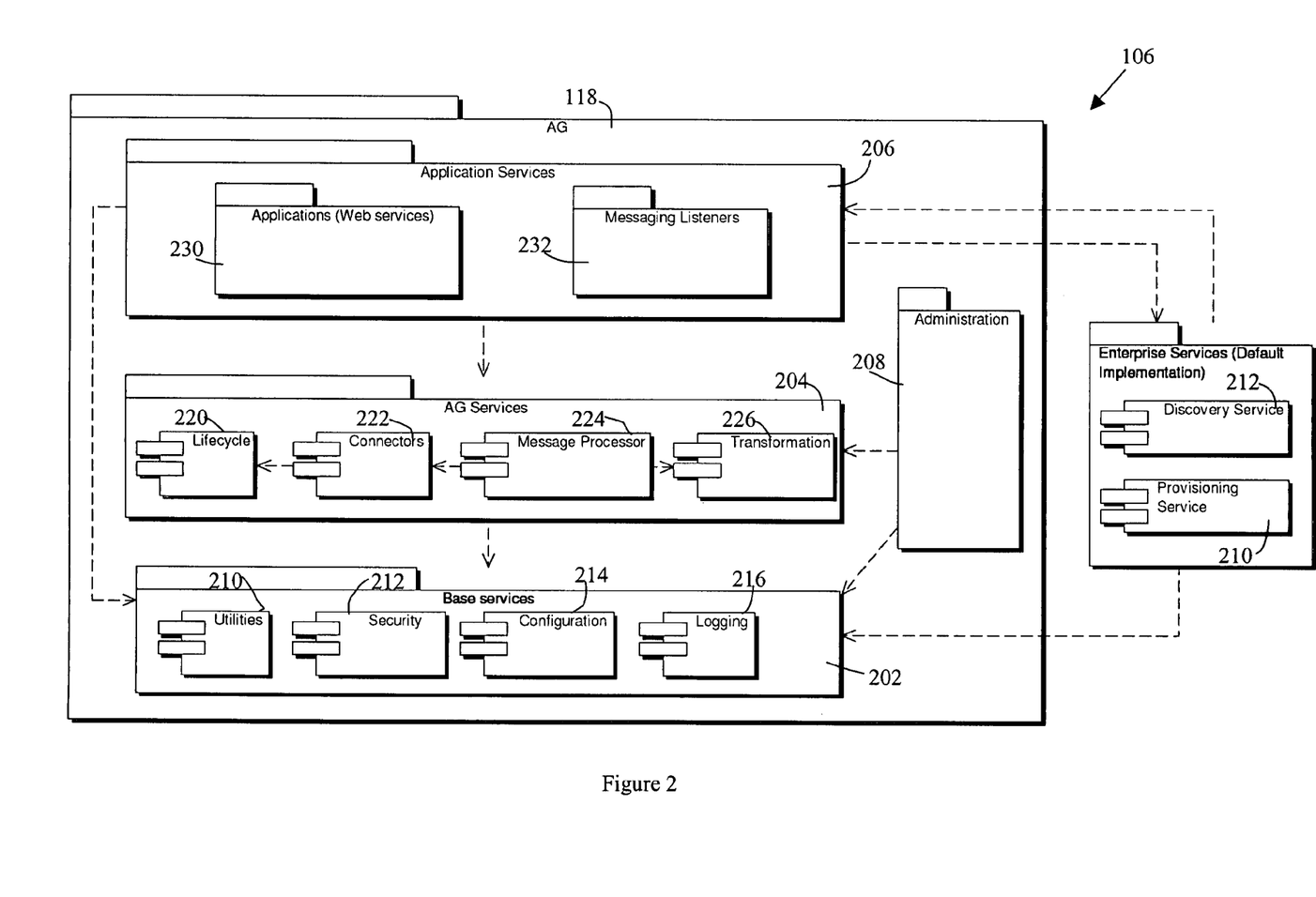
FIG. 2 is a detailed block diagram of the application gateway shown in FIG. 1.

Referring to FIG. 2, a more detailed view of the application gateway 106 is shown. The application gateway server 118 includes three layers of service; a base services layer 202, an application gateway services layer 204 and an application services layer 206. The application gateway server 118 further includes an administration service 208.

A provisioning service 210 and a discovery service 212 are provided by the provisioning server 120 and discovery server 120, respectively.

At the lowest level, the base services layer 202 offers basic, domain independent system services to other components in higher levels. Thus, for example, all subsystems in the application gateway services layer 204 and the application services layer 206 can utilize and collaborate with the subsystems in the base services layer 202. In the present embodiment, the base services layer 202 includes a utilities subsystem 210, a security subsystem 212, a configuration subsystem 214, and a logging subsystem 216.

The application gateway services layer 204 provides wireless component application domain specific services. These services provide efficient message transformation and delivery to backend systems 108 and provide wireless device 102 and component application lifecycle management. In the present embodiment, the application gateway services layer 204 includes a lifecycle subsystem 220, a connector subsystem 222, a messaging subsystem 224, and a transformation subsystem 226.

The application services layer 206 sits at the top of the architecture and provides external program interfaces and user interfaces using subsystems provided by the lower layers. For example, various applications such as a service provider lifecycle application, a packaging application and a message listening application provide external program interfaces since they communicate primarily with applications on external systems. Similarly, an administration application provides a user interface by providing a user with ability to access and potentially modify application gateway data and/or parameters.

The administration service 208 is responsible for administrative system messages, administration of the wireless devices 102, runtime administration of the application gateway subsystems, support and display system diagnostics, and administration of default implementations of the provisioning and discovery services. Relevant portions of the application gateway are described in details as follows.

Messaging Listening Application

The messaging listening application provides an interface for receiving messages from the devices 102 as well as external sources and forwarding them to the messaging subsystem. Further, the message listening application typically authenticates that the source of the message is valid.

Figure 3:
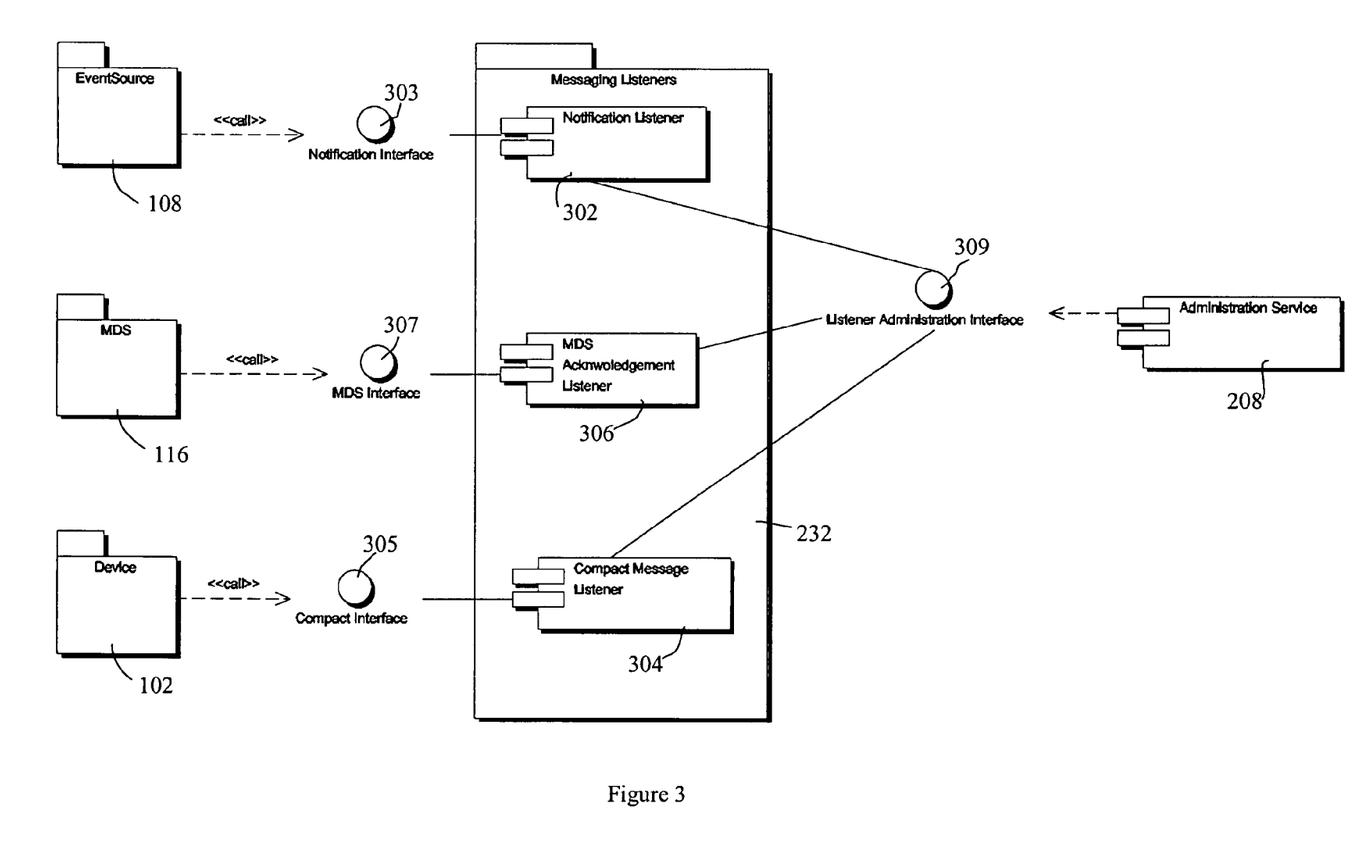
FIG. 3 is a block diagram of a message listening application

Referring to FIG. 3, the message listening application is shown in greater detail. The message listening application includes several listeners; a notification listener 302, a compact message listener 304, and a mobile data service acknowledgement listener 306. The notification listener 302 receives notification and response messages from event sources 108c via a notification interface 303.

For example, the notification interface 303 may be implemented using Web Service (WS) Eventing. Web services often want to receive messages when events occur in other services, such as the event sources, and applications. A mechanism for registering interest is provided in the art by such standards as WS-Eventing and WS Subscription. The standards define a protocol for a client application, referred to as a subscriber, to register interest in data offered by a compliant Web service, referred to as an event source for receiving messages about events, referred to as notifications. When the event source notifies the subscriber of an event, it is referred to as WS Eventing.

The compact message listener 304 receives messages from the devices 102 via a compact message interface 305. The mobile data service acknowledgment listener 306 receives and acknowledges notifications from the mobile data service 116 via a mobile data service interface 307. Each of the listeners 302, 304 and 306 receive administrative messages from the administration service 208 via a listener administrative interface 311.

In the present embodiment the listener interfaces 303, 305, 307 and 311 are configured using Hypertext Transfer Protocol/Hypertext Transfer Protocol over Secure Socket Layer (HTTP/HTTPS). However, it will be appreciated by a person skilled in the art that these protocols have been selected as a design choice and other protocols may be used when desired. Accordingly, external systems transmit a HTTP/HTTPS request, which is received by the appropriate listener. The listener takes the message, makes minimal transformations, and forwards it to the messaging subsystem 224. The transformations include copying HTTP header information into message object fields. For example, the HTTP header information may identify the mobile data service 116 and wireless device 102 from which the message originated.

As previously described, the message listening application authenticates that the source of the message is valid, be it the mobile date service 116, the wireless device 102 or event source 108. Further, if reliable messaging is required, service availability is ensured and the listeners deal with availability attack solutions. In order to facilitate this, the messaging subsystem defines a threshold for a maximum number of messages and connections for a given time period from any backend server 108, component application or device 102. The administrator can modify this threshold as desired, as well as allow for specific exceptions via the administration service 208.

Further, since message interception and replay attack is possible, the listeners detect and prohibit this attack using mechanisms that identify replayed messages. These mechanisms typically include the use of a nonce. A nonce is defined as parameter that varies with time. A nonce can be a timestamp or other special marker intended to limit or prevent the unauthorized replay or reproduction of a message. Because a nonce changes with time, it can be used to determine whether or not a message is original, or a replay or reproduction of the original message. The use of a nonce for preventing interception and replay attacks is known in the art and need not be described in detail, as standard implementations are utilized.

Further, other technologies, such as sequencing, can also be used to prevent replay of application messages in addition to, or in lieu of, the time timestamp technique. Once again, such techniques are known in the art and need not be described in detail, as standard implementations are utilized.

Connectors Subsystem

Figure 4:
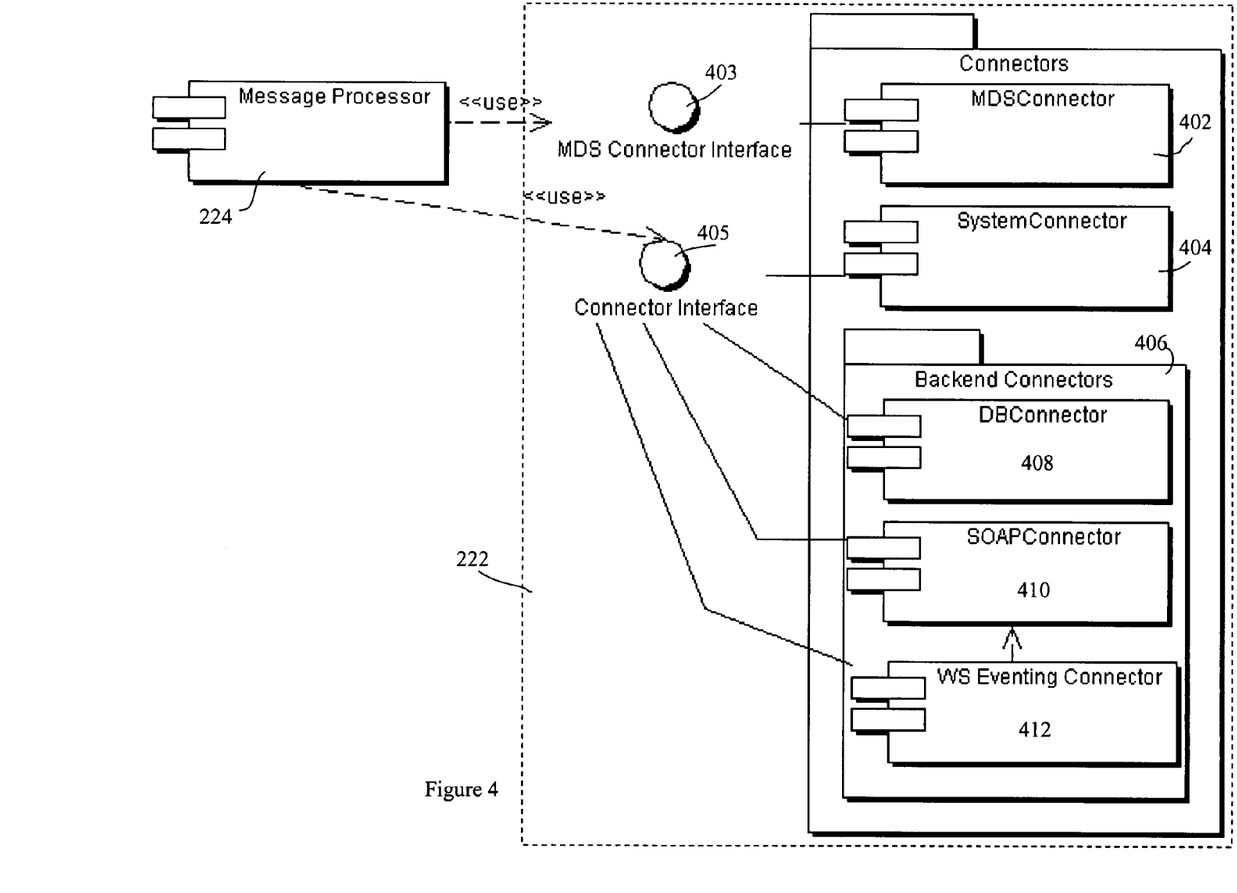
FIG. 4 is a block diagram of a connector subsystem.

The connector subsystem 222 provides transport services between the application gateway 106 and external destination systems using the required transport protocols. Further, the connector subsystem 222 receives synchronous responses from destination systems, and passes them to the message subsystem 224 for processing.

Referring to FIG. 4, a more detailed view of the connector subsystem 222 is shown. The connector subsystem 222 includes a MDS connector 402, a system connector 404 and a set of backend connectors 406. The MDS connector 402 is coupled with the message subsystem 224 via a MDS connector interface 403. The system connector 404 and backend connectors 406 are coupled with the message subsystem 224 via a connector interface 405.

The MDS connector interface 403 is an Application Program Interface (API} for message delivery to the devices 102 in the compact message format. The connector interface 405 is an API for message delivery to internal subsystems or backend systems. In the present embodiment, both APIs are implemented using Java.

The MDS connector 402 delivers compact messages to the wireless device via the MDS 116. The MDS connector 402 works as push initiator to push messages to devices 102. In the present embodiment the MDS connector 402 supports basic push as well as the reliable push to MDS through the Wireless Application Protocol (WAP) to Push (PAP) standard protocol, although other standards can be supported as they are developed.

The system connector 402 delivers system messages to the lifecycle subsystem 220, the administration subsystem 208, or the messaging subsystem 224. Delivery of system messages to any of the specified subsystems is performed by direct API calls. The system connector receives the messages in the internal message format and performs Java API calls to the appropriate subsystem.

The messages communicated between the message processor 224 and the connector interface 405 are in an internal message format. In the present embodiment, the internal message format is compliant with Web Services Description Language (WSDL). The connector interface 405 transmits the message to an associated one of the backend connectors 806.

The backend connector 806 encapsulates the message into the required format and opens a connection with a target backend server 106.

WSDL is a document written in XML for describing a web service. A WSDL document specifies the location of the web service and the operations the web service exposes. Accordingly, it can be seen that WSDL provides a way to group messages into operations and operations into interfaces. It also provides a way to define bindings for each interface and protocol combination along with the endpoint address for each one. A complete WSDL definition includes all of the information used to invoke a web service. Developers that want to make it easy for others to access their web services publish their WSDL definitions.

A WSDL document defines a web service using major elements including type, message, portType, binding and service. The first three elements (types, message, and portType) are all abstract definitions of a web service interface. These elements constitute the programmatic interface that is typically interfaced with code. The last two elements (binding and service) describe the concrete details of how the abstract interface maps to messages on the wire. These details are typically handled by the underlying infrastructure.

The type element defines the data type that is used by the web service. For platform neutrality, WSDL uses XML Schema syntax to define data types. The type definitions are referenced from higher-level message definitions in order to define the structural details of a message.

The message element defines the data elements of an operation. Each message can consist of one or more parts. The parts can be compared to the parameters of a function call in a traditional programming language. A sample WSDL message element is provided below as Example 1.

```
<message name="getTermRequest">
    <part name="term" type="xs:string"/>
</message>
<message name="getTermResponse">
    <part name="value" type="xs:string"/>
</message>
```

EXAMPLE 1

In Example 1, a sample WSDL portion defining two messages is provided. A first message, named 'getTermRequest', is defined as having a parameter named 'term' which is of the type string. A second message, named 'getTermResponse', is defined as having a parameter named 'value' which of the type string.

The portType element defines a group of operations also known as an interface in most environments, so this element is also referred to as the interface element. Accordingly, the portType element correlates a web service with the operations that can be performed and the messages that are involved. A sample WSDL portType element is provided below as Example 2.

```
<portType name="glossaryTerms">
    <operation name="getTerm">
        <input message="getTermRequest"/>
        <output message="getTermResponse"/>
    </operation>
</portType>
```

EXAMPLE 2

In Example 2, the sample WSDL portion is provided for defining a portType element using the messages defined in Example 1. The portType element in Example 2 is named 'glossaryTerms'. The portType element includes an operation element for defining an operation of the web service. Although it is possible to have multiple operation elements for each portType element, the present example shows only one for ease of explanation. The operation element is name 'getTerm' and it uses the message 'getTermRequest' as its input and provides the message 'getTermResponse' as its output.

The binding element describes the concrete details of using a particular portType element with a given transport protocol. The binding element specifies which portType element it's describing through a type attribute. A sample WSDL binding element is provided below as Example 3.

```
<binding type="glossaryTerms" name="b1">
    <soap:binding style="document"
    transport="http://schemas.xmlsoap.org/soap/http" />
        <operation>
            <soap:operation
            soapAction="http://example.com/getTerm"/>
            <input>
                <soap:body use="literal"/>
            </input>
            <output>
                <soap:body use="literal"/>
            </output>
        </operation>
</binding>
```

EXAMPLE 3

In Example 3, the sample WSDL portion is provided for defining a binding element using the portType element defined in Example 2. Through its type attribute, the binding element specifies that it is describing the 'glossaryTerms' portType. The soap:binding element indicates that the message data will be bound using SOAP. The style of the service for the binding is 'document', as opposed RPC, and the transport protocol 'http'. The soap:operation element defines an HTTP header value for each operation. The soap:body element defines how message parts appear inside of the SOAP body element. In the present embodiment, the message parts appear as 'literal', although they may also appear encoded.

The service element defines a collection of ports, or endpoints, that expose a particular binding. Each of the ports is assigned a name and a binding. A sample WSDL service element is provided below as Example 4.

```
<service name="termService">
    <port name="termEndpoint" binding="b1">
        <soap:address
        location="http://localhost/getTerm/getTerm.asmx"/>
    </port>
</service>
```

EXAMPLE 4

In Example 4, the sample WSDL portion is provided for defining a service element for exposing the binding element defined in Example 3. In the present example, the binding 'b1' is to the address "http://localhost/getTerm/getTerm.asmx". Accordingly, the service element defines a web service destination and the binding element defines the transport protocol for communicating with the web service at destination.

From the above, it will be appreciated that there are four types of communication that can be established between the application gateway and a backend server, including one-way communication, request response communication, solicit response communication and notification communication. Of the four, the request-response communication is typically the most common operation type.

For one-way communication, the web service receives a message but does not return a response. For request-response communication, the web-service receives a request and returns a response. For solicit-response communication, the web service sends a request and waits for a response. For notification communication, the web service sends a message but does not wait for a response.

Accordingly, for the WSDL document described above, the messaging subsystem 224 receives a message named 'getTermRequest' and parses a message mapping. The message mapping correlates the message with the 'glossaryTerms' portType. Accordingly, the message is transmitted to the connector interface 405, which interfaces with the SOAP connector 410 in accordance with the 'glossaryTerms' portType. Although the present embodiment includes message and portType elements for defining and identifying message so they can be mapped, it will be appreciated by a person of ordinary skill in the art that other methods of identifying and mapping messages may be implemented.

The SOAP connector 410 encapsulates the message in accordance with the SOAP 1.1 transport protocol, using header and body definitions as provided by the binding element of the WSDL document. The SOAP connector 410 further opens a HTTP connection with http://localhost/getTerm/getTerm.asmx, as defined by the WSDL document. Once the connection is established, the SOAP connector 410 transmits the encapsulated 'getTermRequest' message to the web service and waits for the reply message. Once the reply message is received, the SOAP connector 410 retrieves the relevant data from the encapsulated SOAP response in accordance with the WSDL definition for the response message 'getTermResponse', which transmitted to the messaging subsystem 224 for delivery to the device 102.

However, the service as described above is provided exclusively for web services. Accordingly, the backend connectors 406 include connectors capable of interpreting extended WSDL in order to facilitate communication with non-web service back ends. Such a connector provides the advantage of not having to provide web services that are designed solely to act as an interface between a gateway server and a backend server.

WSDL inherently provides extensibility that allows for customization of WSDL documents. Accordingly WSDL extensibility in both the binding element and the service element is used to facilitate communication with non-web service backend servers. The WSDL binding and service definitions are shown below in Example 5.

WSDL Binding Definition:

```
<wsdl:binding name="nmtoken" type="qname">*
    <wsdl:documentation .../>?
    <-- extensibility element --> *
    <wsdl:operation name="nmtoken">*
        <wsdl:documentation .../> ?
        <-- extensibility element --> *
        <wsdl:input> ?
            <wsdl:documentation .../> ?
            <-- extensibility element -->
        </wsdl:input>
        <wsdl:output> ?
            <wsdl:documentation .../> ?
            <-- extensibility element --> *
        </wsdl:output>
        <wsdl:fault name="nmtoken"> *
            <wsdl:documentation .../> ?
            <-- extensibility element --> *
        </wsdl:fault>
    </wsdl:operation>
</wsdl:binding>
```

WSDL Service Definition:

```
<wsdl:service name="nmtoken"> *
    <wsdl:documentation .../>?
    <wsdl:port name="nmtoken" binding="qname"> *
        <wsdl:documentation .../> ?
        <-- extensibility element -->
    </wsdl:port>
    <-- extensibility element -->
</wsdl:service>
```

EXAMPLE 5

The three specific WSDL extensibility elements that were manipulated in the present embodiment are highlighted in bold type. These extensibility elements include those for the input and output elements of the binding element as well as the extensibility element for the port element of the service element. The data structure of these extensibility elements as well as the systems and methods for implementing them are described below.

An example of a binding element implementation illustrating how WSDL is extended to support access to a backend server comprising a relational database is show below in Example 6.

```
<wsdl:binding name="personnelAvailableBinding" type=
"impl:workOrdersDbPort">
    <wsdl:operation name="getAllWorkOrders">
        <wsdl:input name="sql">
            <wica:params name="ordered"/>
            <wica:sql type="select">
                <![CDATA[select ASSIGNED_TIME, ASSIGNED_TO,
                CLIENT_DETAILS, COMPLETED_TIME,
                CREATED_TIME, ID, JOB_TYPE, NOTES, PRIORITY,
                STARTED_TIME, STATUS
                from orders
                where PERSONNEL_NAME=?]]>
            </wica:sql>
        </wsdl:input>
        <wsdl:output>
            <wica:params name="ordered"/>
        </wsdl:output>
    </wsdl:operation>
</wsdl:binding>
```

EXAMPLE 6

Similarly to the binding element described in Example 3, the binding element in the present example includes binding name and type attributes. The type attribute 'workOrdersDbPort' identifies the portType to which the binding element corresponds. The input element identifies an input name 'sql'.

The extensibility element of the input is prefaced by the prefix 'wica'. This prefix indicates that the element is not a standard WSDL element and is, otherwise, of little significance as will be appreciated by a person of ordinary skill in the art. The first extensibility element is a params element named 'ordered'. The params element is defined to indicate how the parameters are to be interpreted. In the present example, the parameters are ordered.

An sql element is also provided for defining a Structured Query Language (SQL) statement to be submitted to the relational database. The sql element is of type 'select', which indicates that the SQL statement is a select statement. The sql element further includes a CDATA statement, which explicitly identifies the SQL statement to be executed against the relational database. A CDATA statement is used since the information contained therein is not parsed by an XML parser.

An example of a service element implementation illustrating how WSDL is extended to support access to a backend server comprising a relational database is show below in Example 7.

```
<wsdl:service name="workOrdersDbService">
    <wsdl:port name="personnelAvailableIF"
    binding="personnelAvailableBinding">
        <wica:dbconnector user="admin" password="asdf1234"
        url="jdbc:microsoft:sqlserver://bambi:1433">
            <property key="DatabaseName" value="agdb"/>
            <property key="selectMethod" value="cursor"/>
        </wica:dbconnector>
    </wsdl:port>
</wsdl:service>
```

EXAMPLE 7

Similar to the sample service element in Example 4, the service is provided with a port name and a corresponding binding. In Example 7, the port name 'personnelAvailableIF' exposes the binding element 'personnelAvailableBinding' defined in Example 6.

The extensibility element of the port is prefaced by the prefix 'wica'. Similarly to Example 6, this prefix indicates that the element is not a standard WSDL element. The extensibility element is used to define a connection to a backend server. The extensibility element indicates that the connection is for a database server by using element 'dbconnector'.

The user name, password and uniform resource locator (URL) for locating and accessing the database are included as pre-programmed parameters of the 'dbconnector' element. The URL for the database server includes a communication protocol 'jdbc', a vendor 'microsoft', a driver 'sqlserver', a server '//bambi' and a port number '1433'.

The dbconnector element also includes a pair of property keys, 'DatabaseName' and 'selectMethod', and associated values. The property key 'DatabaseName' identifies the name of the database to be accessed on the database server. The property key 'selectMethod' identifies the type of object into which the query result is placed.

The remaining WSDL documentation for the JDBC example typically also includes message and portType elements as shown is Example 8. However, it will be appreciated by a person of ordinary skill in the art that there need not be anything added to these elements in order to facilitate accessing heterogeneous backend servers.

```
<message name="PersonnelAvailableRequest">
    <part name="term" type="xs:string"/>
</message>
<message name="PersonnelAvailableResponse">
    <part name="value" type="xs:string"/>
</message>
<portType name="workOrdersDbPort">
    <operation name="getPersonnel">
        <input message="PersonnelAvailableRequest"/>
        <output message="PersonnelAvailableResponse"/>
    </operation>
</portType>
```

EXAMPLE 8

Accordingly, for the WSDL document described above, the messaging subsystem 224 receives a message named 'PersonnelAvailableRequest' and parses a message mapping. The message mapping correlates the message with the 'workOrdersDbPort' portType. Accordingly, the message is transmitted to the connector interface 405, which interfaces with the JDBC connector 408 in accordance with the 'workOrdersDbPort' portType. Similarly to the previous embodiment, although message and portType elements are provided for defining and identifying message so they can be mapped, a person of ordinary skill in the art will appreciated that other methods of identifying and mapping messages may be implemented.

The JDBC connector encapsulates the message in accordance with the associated binding element. In the present example, binding element defines a select SQL statement for selecting a number of predefined fields from a database named 'orders' for a given predetermined field. Specifically, for a given PERSONNEL_NAME, the remaining database fields are retrieved. The SQL statement defines a where clause for PERSONNEL_NAME, with a target of the where clause left as a variable, or '?'. Accordingly, the corresponding input message includes the target of the where clause. The JDBC connector, therefore, encapsulates the message for submission to the relational database by completing the SQL statement and replacing the '?' with the target data from the input message. The completed SQL statement is ready to be submitted to the relational database.

The JDBC connector proceeds to open a connection to the appropriate backend server in accordance with the service element. The service element defines the location, user and password information of the relational database. Once the JDBC connector has established a connection, it transmits the encapsulated SQL query and waits for a response. Once the reply message is received, the JDBC Connector 408 retrieves the relevant data from the encapsulated response in accordance with the WSDL definition. The retrieved data is formatted in accordance with the response message 'PersonnelAvailableResponse', which is transmitted to the messaging subsystem 224 for delivery to the device 102.

Thus it can be seen that the service element described in Example 7 exposes the binding described in Example 6. Further, if other inputs and/or operations are added to the binding described in Example 6, they too will be exposed by the service element. Yet further, it is possible to expose other types of backend servers to the application gateway by providing a corresponding connector and defining the WSDL extensions for use therewith. Therefore, the system described above allows the connection with heterogeneous backend servers on an application or even message basis, which can provide flexibility for application designers.

Accordingly, it will be appreciated that the JDBC connector is programmed with the knowledge of the extensibility elements for the binding and service elements. The JDBC connector is, therefore, capable of interpreting the binding element to encapsulate the incoming message and interpreting the service element to connect to the relational database. Therefore, as long as an application developer knows the available extensibility elements and how the connector implements them, they can be used to enhance the application to provide connectivity to the backend server. As long as a connecter is provided for a corresponding backend server, the application developer can develop an application that communicates with that backend server.

Further, although the previous example relates specifically to a relational database server as the backend server, a person skilled in the art will appreciate that the system can be applied to any backend server for which a connector can be developed.

Accordingly, the system described above provides a solution for enabling connectivity to heterogeneous backend servers to support wireless applications, thus keeping the existing infrastructure intact while allowing a third party to extend connectivity to different backend servers as they become available.

However, from the above description, it will be apparent to a person skilled in the art that in order to be able to completely take advantage of the extensibility provided by the system and access all available backend servers, the application developer would need to know the extensibility elements available and how to invoke them.

Accordingly, a mechanism is implemented to simplify the process and make the extensibility elements transparent to the application developers. In one embodiment, application developers are assisted in developing applications for heterogeneous backend servers by being provided with a plug-in/connector pair.

Figure 5:
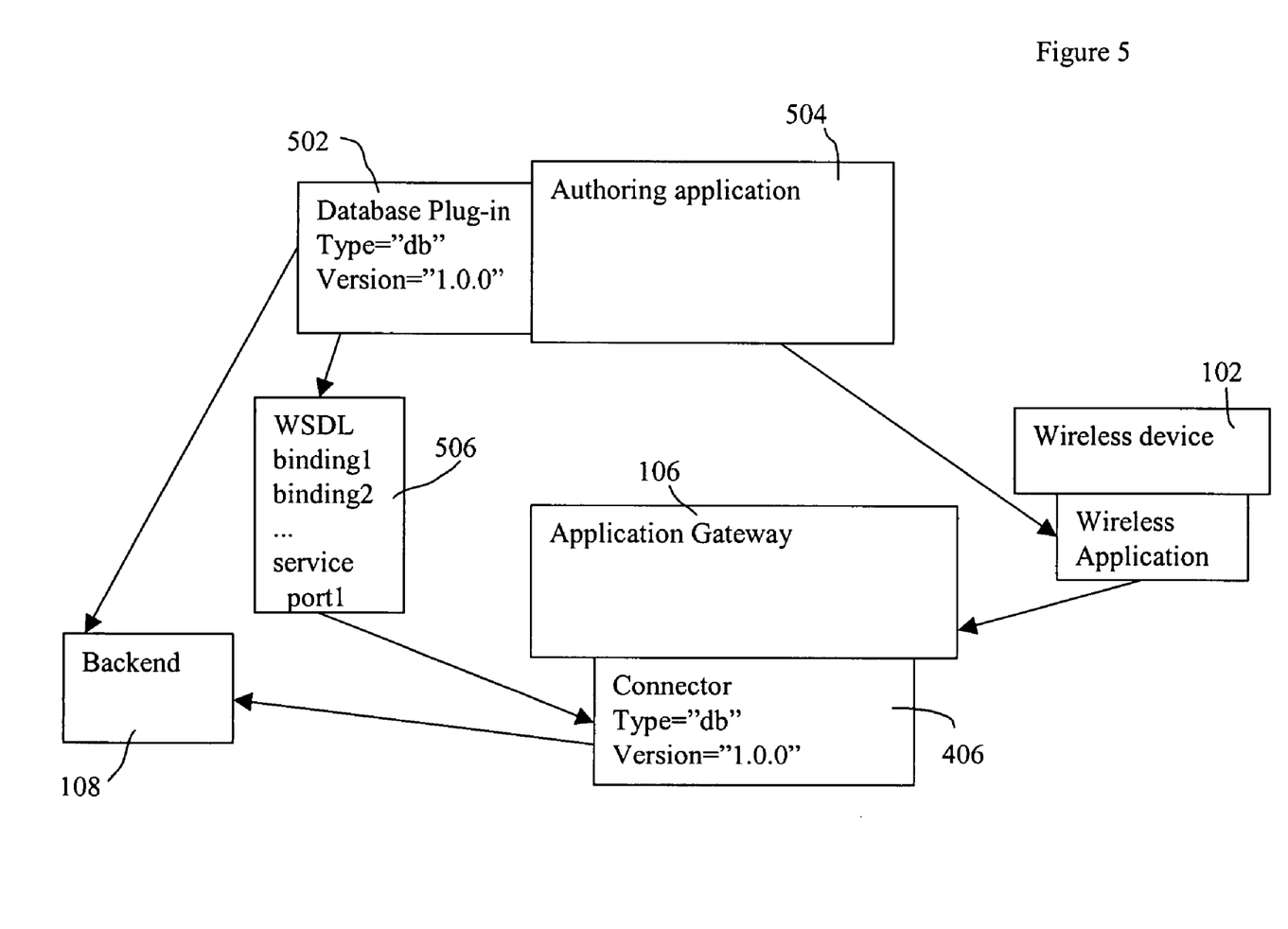
FIG. 5 is a block diagram illustrating an embodiment of the present invention.

Referring to FIG. 5, a block diagram illustrating the present embodiment is shown generally by numeral 500. A plug-in 502 is provided to an authoring application 504 to generate a backend definition 506 in WSDL format using an assembler (not shown). The application development environment 107 runs on an application developer's computer. As is standard in the art, the computer includes one or more computer readable storage media, such as a hard drive, a random access memory (RAM) or other storage element, for storing computer programs as a series of instructions. Alternately, the computer provides access to an external computer readable storage media such as optical or magnetic storage discs, flash drives and the like. The computer further includes a processor, or processors, configured to execute the instructions to provide the functionality of the computer program. Typically, such computers are desktop computers as application developers often find larger displays and increased processing power afforded by desktop computers to be advantageous. However, a person of ordinary skill in the art will appreciate that other computers can be used depending as desired.

The plug-in 502 is in communication with the authoring application 504 via an application program interface (API). As such, the plug-in 502 may interact directly with a user via a graphical user interface (GUI) or may interact solely with the authoring application 504 and be transparent to the user.

In the present embodiment, the authoring application 504 is implemented using the Eclipse Platform, or Eclipse. Eclipse is designed to support the construction of a variety of tools for application development. Further, Eclipse supports an unrestricted set of tool providers, including independent software vendors (ISVs) as well as tools for manipulating arbitrary content types (for example HTML, Java, C, JSP, EJB, XML, and GIF). Eclipse supports both GUI and non-GUI-based application development environments.

Eclipse comprises a plug-in architecture, wherein a plug-in is the smallest unit that can be developed and delivered separately from the development environment. Usually a small tool is written as a single plug-in, whereas a complex tool has its functionality split across several plug-ins. plug-ins are coded in Java and a typical plug-in consists of Java code in a JAR library, some read-only files, and other resources such as images, web templates, message catalogs, native code libraries, and the like.

Each plug-in has a manifest file declaring its interconnections to other plug-ins. In order to define interconnections a plug-in declares any number of named extension points, and any number of extensions to one or more extension points in other plug-ins. Eclipse is a well-known environment, and these and other features are thoroughly described at www.eclipse.org.

In the present embodiment, the backend definition 506 includes the binding and service elements. The plug-in 502 is designed to incorporate WSDL extension elements into the binding and service elements, if required. The extension elements may be proprietary or publicly available, depending on the implementation. Further, the plug-in 502 is capable of connecting to the backend server 108 directly for allowing the application developer to test the application.

The connector 406 is designed to understand the WSDL format generated by the plug-in 502 and invoke a corresponding backend server 108. Accordingly, the device 102 constructs backend-independent messages, which are translated into a WSDL style operation call by the transformation subsystem 226. In the present embodiment this is achieved using a transformer mapping document that maps messages received from the device into a predefined WSDL document. It will be appreciated by a person of ordinary skill in the art that other translation schemes may be used. Alternately, the device may construct SOAP messages directly. This operation call is passed to the connector 406, which uses the call parameters and the plug-in generated WSDL backend definition 506 to correctly call the appropriate backend server 108.

Each plug-in 502/connector 406 pair is identified by two identification (ID) parameters; connector type and version identifier. These ID parameters are passed to the application gateway 106 when installing an application for the first time. Accordingly, the ID parameters are used for locating a compatible connector for the plug-in generated WSDL backend definition. Thus, when a message is received from the device 102 it is mapped to the corresponding WSDL backend definition and encapsulated and transmitted to the backend server 108 by the associated connector 406.

This approach leaves the authoring application and the application gateway intact while extending the system's connectivity. Further, since the plug-in and the connector are developed to be complementary, all of the available extensibility elements, their definitions and their implementation are known by the plug-in such that the plug-in is able to generate the required WSDL document. Also, the connector is programmed to be able to understand and implement the WSDL document to communicate with the appropriate backend server.

Figure 6:
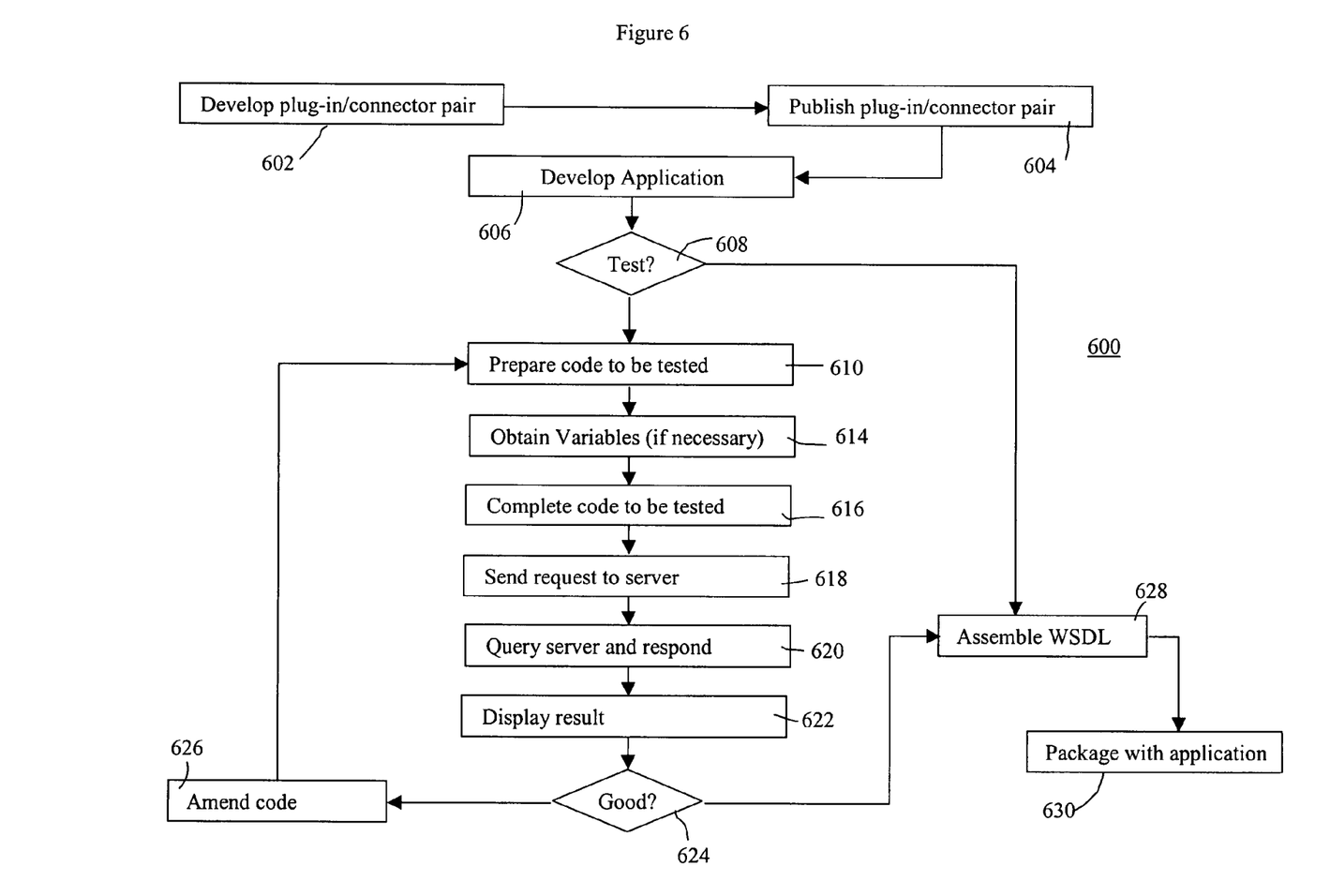
FIG. 6 is a flow chart illustrating the operation of an embodiment of the present invention.

Referring to FIG. 6, a flow chart is provided for illustrating how the plug-in/connector pair could be used to create the extended WSDL documents illustrated in Examples 6 and 7. In step 602, the plug-in/connector pair is developed by a party who wishes to expose a relational database to an application developer.

In step 604, the connector is made available to the application gateway and the plug-in is made available to the application developer. The plug-in may be made available publicly by placing it on a web site. Alternately, the plug in may be made available only to a list of application developers who meet certain criteria, such as for example a list of subscribers.

In step 606, the application developer uses the plug-in to program a component that can access the relational database. Specifically, the application developer uses the plug-in to allow the application to query the relational database via a message. In the present example, the application developer needs to query the relational database using a 'select, from, where' clause. Since the plug-in is in communication with the relational database, it can provide the application developer with a list of available fields.

The application developer selects the desired fields for the query and defines a field that may vary depending on the message. In the present example, the application is developed to provide selected information for a given PERSONNEL_NAME. Accordingly, the PERSONNEL_NAME field is defined as a variable so that a user will be able to obtain comparable information for different people.

In step 608, the application developer can choose to test the programmed SQL statement. If the application developer chooses to test the SQL statement, the operation continues at step 610, otherwise it continues as step 628.

In step 610, the plug-in assembles the SQL statement defined by the application developer. The plug-in determines whether or not any variables where defined for the SQL statement. If variables were defined, the operation continues at step 614, otherwise it continues at step 618.

In step 614, the plug-in prompts the user to input the required variables, thereby mimicking the function of a received message. This is achieved by prompting the application developer with pop-up boxes including text boxes. In step 616, the plug-in replaces the variables in the assembled SQL statement with the data provided by the application developer. In the present example, the data would have included a name. The operation then proceeds to step 618.

In step 618, the plug-in contacts the relational database server and submits the SQL query. In step 620, the relational database performs the SQL query and returns a result to the plug-in. In step 622, the plug-in displays the returned result to the application developer for review.

In step 624, the user has the option to decide whether or not the returned result is acceptable. If the result is acceptable the operation continues at step 628, otherwise it continues at step 626. If the result from the relational database was an error, or other unexpected result, the user can amend the statement accordingly at step 626. The operation returns to step 612 and assembles the SQL statement.

In step 628, the plug-in assembles the WSDL backend definition in accordance with defined SQL statement and the defined extensibility elements for the plug-in/connector pair. In step 630 the WSDL backend definition is packaged with the application and loaded onto the application gateway 106. In the present embodiment, the WSDL backend definition is loaded onto the application gateway 106 when the application is provisioned on a device 102.

As previously described, those developers that want to make it easy for others to access their web services publish their WSDL definitions. However, this may be a problem with the embodiment as described above. For example, in the JDBC example provided, the user's credentials, such as user name and password, are included as part of the WSDL definition. Similarly, the target URL of the database is also part of the WSDL definition. As such, this information may be subject to publication. For obvious reasons, it is often preferable that such information not be published.

Accordingly, in the present embodiment the plug-in creates a WSDL file to be published that does not include potential sensitive information. In its stead are dummy markers. The plug-in further creates a corresponding XML document that is not published, and includes the sensitive information left out of the published WSDL file. When the application is installed on the application gateway, both the WSDL file and the corresponding XML file are retrieved from a repository where the application bundle is safely stored. A merge process retrieves the data from the XML document and overwrites the corresponding dummy markers in the WSDL file so that the once loaded on the application gateway, the WSDL file includes all necessary information. Thus, the present embodiment limits concerns of published potentially sensitive information.

Accordingly, it will be apparent to a person of ordinary skill in the art that even though the connector and the plug-in may use their own proprietary WSDL extensions to describe a backend server, these extensions are completely transparent to both the authoring application and application gateway infrastructure.

Yet further, although the present embodiment has been described with reference to WSDL, the invention need not be limited using WSDL. A person skilled in the art will appreciate that WSDL provides a way to group messages into operations and operations into interfaces. It also provides a way to define bindings for each interface and protocol combination along with the endpoint address for each one. Thus, the WSDL document effectively decouples the messages for communicating with a backend server from the connectivity information required to make the connection. Accordingly, other structured schema-based languages that provide similar functionality to WSDL may be used, as desired.

Although preferred embodiments of the invention have been described herein, it will be understood by those skilled in the art that variations may be made thereto without departing from the spirit of the invention or the scope of the appended claims.

What is claimed is:

1. A computer readable storage medium comprising computer code for execution by a processor, the computer code configured to provide a plug-in for use with an authoring application, the plug-in for facilitating development of a wireless application by enabling communication with a backend server via a corresponding connector, the computer code comprising instructions for the plug-in to provide:
(a) an interface for interfacing with the authoring application and for receiving from the authoring application a desired inquiry to be made to the backend server; and
(b) an assembler for creating a schema-based description document describing the inquiry in accordance with a set of predefined criteria for enabling the connector to interpret the description document.

2. The computer readable storage medium of claim 1 further comprising computer code for providing a connection interface for connecting to the backend server for enabling testing of the wireless application during development.

3. The computer readable storage medium of claim 1, wherein the description document excludes potentially sensitive information and the assembler creates a data document for including such information, the description document being published and the data document being secret.

4. A computer readable storage medium comprising computer code for execution by a processor for facilitating communication between a wireless application and a backend server wherein the computer code provides instructions for providing:
(a) a plug-in is for use with an authoring application for creating the wireless application as well as a schema-based description document describing possible backend server inquiries available to the wireless application in accordance with a set of predefined criteria; and
(b) a connector is for use with a gateway server for interpreting the schema-based document in accordance with the set of predefined criteria and establishing a connection with the backend server in response to at least one of the backend server inquiries from the wireless application.

5. The computer readable storage medium of claim 4, wherein the description document excludes potentially sensitive information and a data document for includes such information, the description document being published and the data document being secret.

* * * * *

UNITED STATES PATENT AND TRADEMARK OFFICE
CERTIFICATE OF CORRECTION

| | | |
|---|---|---|
| PATENT NO. | : 7,624,370 B2 | Page 1 of 1 |
| APPLICATION NO. | : 11/107887 | |
| DATED | : November 24, 2009 | |
| INVENTOR(S) | : Bibr et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1227 days.

Signed and Sealed this

Fourteenth Day of December, 2010

David J. Kappos
*Director of the United States Patent and Trademark Office*